US011368071B2

(12) United States Patent
Worker et al.

(10) Patent No.: US 11,368,071 B2
(45) Date of Patent: Jun. 21, 2022

(54) ELECTRIC DRIVE

(71) Applicant: Dyson Technology Limited, Wiltshire (GB)

(72) Inventors: David Colin Worker, Swindon (GB); Richard Iain Mockridge, Gloucester (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 16/982,246

(22) PCT Filed: Feb. 18, 2019

(86) PCT No.: PCT/GB2019/050419
§ 371 (c)(1),
(2) Date: Sep. 18, 2020

(87) PCT Pub. No.: WO2019/180403
PCT Pub. Date: Sep. 26, 2019

(65) Prior Publication Data
US 2021/0036578 A1    Feb. 4, 2021

(30) Foreign Application Priority Data
Mar. 21, 2018   (GB) ...................................... 1804524

(51) Int. Cl.
*H02K 7/10*      (2006.01)
*F16H 13/08*     (2006.01)
(Continued)

(52) U.S. Cl.
CPC ............... *H02K 7/10* (2013.01); *F16H 13/08* (2013.01); *F16H 13/14* (2013.01); *H02K 5/1735* (2013.01)

(58) Field of Classification Search
None
See application file for complete search history.

(56) References Cited

U.S. PATENT DOCUMENTS

| 5,931,759 A | 8/1999 | Dtaki et al. |
| 2001/0029219 A1 | 10/2001 | Minegishi et al. |

(Continued)

FOREIGN PATENT DOCUMENTS

| EP | 0877181 A1 | 11/1998 |
| EP | 2992801 A1 | 3/2016 |

(Continued)

OTHER PUBLICATIONS

International Search Report and Written Opinion dated Apr. 17, 2019, directed to International Application No. PCT/GB2019/050419; 10 pages.

(Continued)

*Primary Examiner* — Colby M Hansen
(74) *Attorney, Agent, or Firm* — Faegre Drinker Biddle & Reath LLP

(57) ABSTRACT

An electric drive includes a motor and a transmission for transferring torque from the motor to a tool. The transmission includes a plurality of planetary rollers which are driven by a rotary shaft of the motor, and an output ring which is connectable to the tool, and which is driven by the planetary rollers. The transmission further includes a roller casing which is secured to a housing of the motor, and which supports parallel planetary shafts upon which the planetary rollers are mounted for rotation relative to the roller casing, and a bearing having an inner race which engages the roller casing, and an outer race which engages the inner periphery of the output ring.

5 Claims, 7 Drawing Sheets

(51) Int. Cl.
*F16H 13/14* (2006.01)
*H02K 5/173* (2006.01)

(56) References Cited

U.S. PATENT DOCUMENTS

| | | |
|---|---|---|
| 2004/0121601 A1 | 6/2004 | Ai et al. |
| 2004/0129097 A1 | 7/2004 | Otaki |
| 2010/0050988 A1 | 3/2010 | Alajoki et al. |
| 2017/0009873 A1 | 1/2017 | Watanabe |
| 2017/0146096 A1 | 5/2017 | Watanabe |
| 2018/0245626 A1* | 8/2018 | Volak .................. H02K 5/1735 |
| 2021/0036578 A1* | 2/2021 | Worker ............... H02K 5/1735 |

FOREIGN PATENT DOCUMENTS

| | | |
|---|---|---|
| EP | 2811884 B1 | 5/2016 |
| EP | 3232087 A1 | 10/2017 |
| GB | 2488003 A | 8/2012 |
| JP | H1-242865 A | 9/1989 |
| JP | H6-307512 A | 11/1994 |
| JP | H10-246300 A | 9/1998 |
| JP | H10-252852 A | 9/1998 |
| JP | H10-252854 A | 9/1998 |
| JP | H11-2299 A | 1/1999 |
| JP | H11-13848 A | 1/1999 |
| JP | H11-22799 A | 1/1999 |
| JP | H11-37240 A | 2/1999 |
| JP | 2000-35098 A | 2/2000 |
| JP | 2000-227149 A | 8/2000 |
| JP | 2000-240746 A | 9/2000 |
| JP | 2000-240747 A | 9/2000 |
| JP | 2001-248701 A | 9/2001 |
| JP | 2002-031203 A | 1/2002 |
| JP | 2002-81518 A | 3/2002 |
| JP | 2002-221262 A | 8/2002 |
| JP | 2002-276749 A | 9/2002 |
| JP | 2002-295617 A | 10/2002 |
| JP | 2002-323102 A | 11/2002 |
| JP | 2003-28253 A | 1/2003 |
| JP | 2003-28254 A | 1/2003 |
| JP | 2003-83408 A | 3/2003 |
| JP | 2003-90401 A | 3/2003 |
| JP | 2003-130158 A | 5/2003 |
| JP | 2003-199289 A | 7/2003 |
| JP | 2003-211980 A | 7/2003 |
| JP | 2003-214513 A | 7/2003 |
| JP | 2003-222214 A | 8/2003 |
| JP | 2003-230252 A | 8/2003 |
| JP | 2003-343435 A | 12/2003 |
| JP | 2004-3543 A | 1/2004 |
| JP | 2004-019808 | 1/2004 |
| JP | 2004-80868 A | 3/2004 |
| JP | 2004-96817 A | 3/2004 |
| JP | 2004-116671 A | 4/2004 |
| JP | 2005-30490 A | 2/2005 |
| JP | 2006-103521 A | 4/2006 |
| JP | 2006-117003 A | 5/2006 |
| JP | 2013-23068 A | 2/2013 |
| JP | 2014-58993 A | 4/2014 |
| JP | 2016-34223 A | 3/2016 |
| JP | 2016-052510 A | 4/2016 |

OTHER PUBLICATIONS

Search Report dated Aug. 22, 2018, directed to GB Application No. 1804524.5; 2 pages.
Notice of Reasons for Refusal received for Japanese Application No. 2020-550611, dated Nov. 30, 2021, 6 pages (3 pages of English Translation and 3 pages of Original Document).

* cited by examiner

ELECTRIC DRIVE

REFERENCE TO RELATED APPLICATIONS

This application is a national stage application under 35 USC 371 of International Application No. PCT/GB2019/050419, filed Feb. 18, 2019, which claims the priority of United Kingdom Application No. 1804524.5, filed Mar. 21, 2018, the entire contents of each of which are incorporated herein by reference.

FIELD OF THE DISCLOSURE

The present invention relates to an electric drive. The electric drive may be used to rotate a brush bar of a surface treating appliance, such as a vacuum cleaner. The electric drive may also be used to drive components of vehicles, autonomous devices or domestic products.

BACKGROUND OF THE DISCLOSURE

Cleaner heads can include a surface agitator, for instance a rotary brush bar, which is driven by a drive comprising an electric motor or a turbine. The drive may be housed within the brush bar so that the overall size of the cleaner head can be reduced.

An electric drive for a brush bar generally comprises a motor and a transmission for transferring torque from the motor to the brush bar. The transmission comprises an epicyclic gear box, having a set of gears with meshing teeth.

SUMMARY OF THE DISCLOSURE

According to various embodiments, the present invention provides an electric drive comprising a motor having a rotary shaft; and a transmission comprising a plurality of planetary rollers which are driven by the shaft; an output ring which is driven by the planetary rollers; the planetary rollers comprising at least one relatively large diameter planetary roller and a plurality of relatively small diameter planetary rollers, wherein one of the relatively small diameter planetary rollers is movable under load into a convergent wedge gap defined by the rotary shaft and the output ring; a roller casing secured to a housing of the motor, the roller casing supporting parallel planetary shafts upon which the planetary rollers are mounted for rotation relative to the roller casing; and a bearing having an inner race which engages the roller casing, and an outer race which engages the inner periphery of the output ring.

According to various embodiments, the invention replaces the conventional epicyclic gear box having meshing gears with planetary rollers located in an annular space between the rotary shaft of the motor and the output ring of the transmission. The rollers transfer torque from the rotary shaft to the output ring via frictional forces generated between the outer periphery of the rotary shaft and the outer peripheries of the planetary rollers with rotation of the rotary shaft, and via frictional forces generated between the outer peripheries of the planetary rollers and the inner periphery of the output ring with rotation of the planetary rollers. A lubricant, or traction grease, is preferably provided within the transmission so that torque is transferred from the rotary shaft to the planetary rollers, and from the planetary rollers to the output ring, through thin layers of the lubricant.

Due to the absence of meshing teeth, the noise generated during use of the transmission can be significantly lower than that generated during use of a conventional epicyclic gear box. The use of planetary rollers instead of meshed gears can allow a wider range of gear ratios to be achieved within a given space envelope, which can in turn provide a wider range of options for the output torque and output rotational speed of the transmission.

The planetary rollers comprise at least one relatively large diameter planetary roller and a plurality of relatively small diameter planetary rollers. The rotational axis of the output ring is thus offset from the rotational axis of the rotary shaft of the motor. Under load, one of the relatively small diameter planetary rollers is movable laterally into a convergent wedge gap defined by tangents to the rotary shaft and the output ring, generating substantial contact forces between the planetary roller, shaft and output ring. This (moveable) planetary roller is preferably biased towards the wedge gap to a position in which the planetary roller is placed under substantially no load. The biasing force is preferably applied by a resilient element which is located between the roller casing and the planetary shaft upon which the moveable planetary roller is mounted.

The wedge angle is chosen to provide a balance between providing contact forces of sufficient magnitude and an acceptable fatigue life of the transmission. The wedge angle is preferably less than 12°, and in a preferred embodiment is in the range from 3 to 6°, when no load is applied to the transmission. As load is applied to the transmission, the moveable planetary roller moves into the wedge gap defined between the rotary shaft and the outer ring. As the radial position of the outer ring relative to the roller casing and the motor housing is fixed by the bearing located between the roller casing and the outer shaft, the movement of the moveable planetary roller into the wedge gap is accommodated by lateral movement of the rotary shaft relative to the motor housing. This may be achieved through supporting the rotary shaft only at or towards the rear end thereof, which end is remote from the transmission, or by providing only a relatively loose, or floating, plain bearing towards the front end of the rotary shaft.

The use of this transmission, with a planetary roller having a laterally moveable planetary shaft, also facilitates the assembly of the transmission. To locate the output ring about the planetary rollers, a load is applied to adjust the position of the moveable planetary roller relative to the other planetary rollers so that the output ring can be moved into position about the planetary rollers.

The cover plate preferably houses bearings for supporting the planetary rollers for rotation relative to the roller casing. The base plate is preferably secured to a housing of the motor to reduce the space envelope of the electric drive.

As mentioned above, the drive comprises a bearing, which supports the output ring in both radial and axial directions relative to the motor housing. By fixing the position of the output ring relative to the motor housing, and instead allowing the rotary shaft to move relative to the motor housing to accommodate movement of the moveable planetary roller within the transmission, the axial and radial positions of a tool which is connected to the output ring similarly become fixed. This is particularly useful where maintaining fixed radial and axial positions of the tool is beneficial to the performance of the tool, such as a brush bar of a surface treating appliance. Furthermore, any side impact on the tool during the use thereof is transferred through the bearing to the motor housing, and not to the more sensitive components of the electric drive, such as the planetary rollers and the rotary shaft of the motor.

The bearing has an inner race which engages the roller casing, and an outer race which engages the inner periphery of the output ring. The outer periphery of the roller casing preferably comprises an annular casing groove having a circumferential surface and at least one axial surface, and wherein the inner race of the bearing engages the surfaces of the casing groove. The inner periphery of the output ring preferably comprises an annular output ring groove having a circumferential surface and at least one axial surface, and wherein the outer race of the bearing engages the surfaces of the output ring groove. The bearing thus also provides a seal for isolating the interior of the transmission from external dirt and debris, and for inhibiting the egress of lubricant from the transmission.

The gear ratio of the electric drive is preferably in the range from 2:1 to 10:1. In one embodiment, the maximum rotational speed of the rotary shaft of the motor is around 25,000 rpm, and the maximum rotational speed of the output ring is in the range from 3,000 to 3,500 rpm. This output speed would be appropriate for driving a brush bar which is adapted for agitating the fibres of a carpet. In another embodiment, the maximum rotational speed of the rotary shaft of the motor is around 8,000 rpm, and the maximum rotational speed of the output ring is in the range from 800 to 1,200 rpm. This output speed would be appropriate for driving a brush bar which is adapted for agitating dust from a hard floor surface.

According to various embodiments, the present invention further provides a cleaner head for a vacuum cleaner, the cleaner head comprising a casing, a brush bar, and an electric drive as aforementioned for driving rotation of the brush bar relative to the casing, the brush bar being connected, directly or indirectly, to the output ring of the transmission.

The electric drive may also be used to drive components of vehicles, autonomous devices and domestic products.

BRIEF DESCRIPTION OF THE FIGURES

Preferred features of the invention will now be described, by way of example only, with reference to the accompanying drawings, in which.

DETAILED DESCRIPTION OF THE DISCLOSURE

Figure 1:
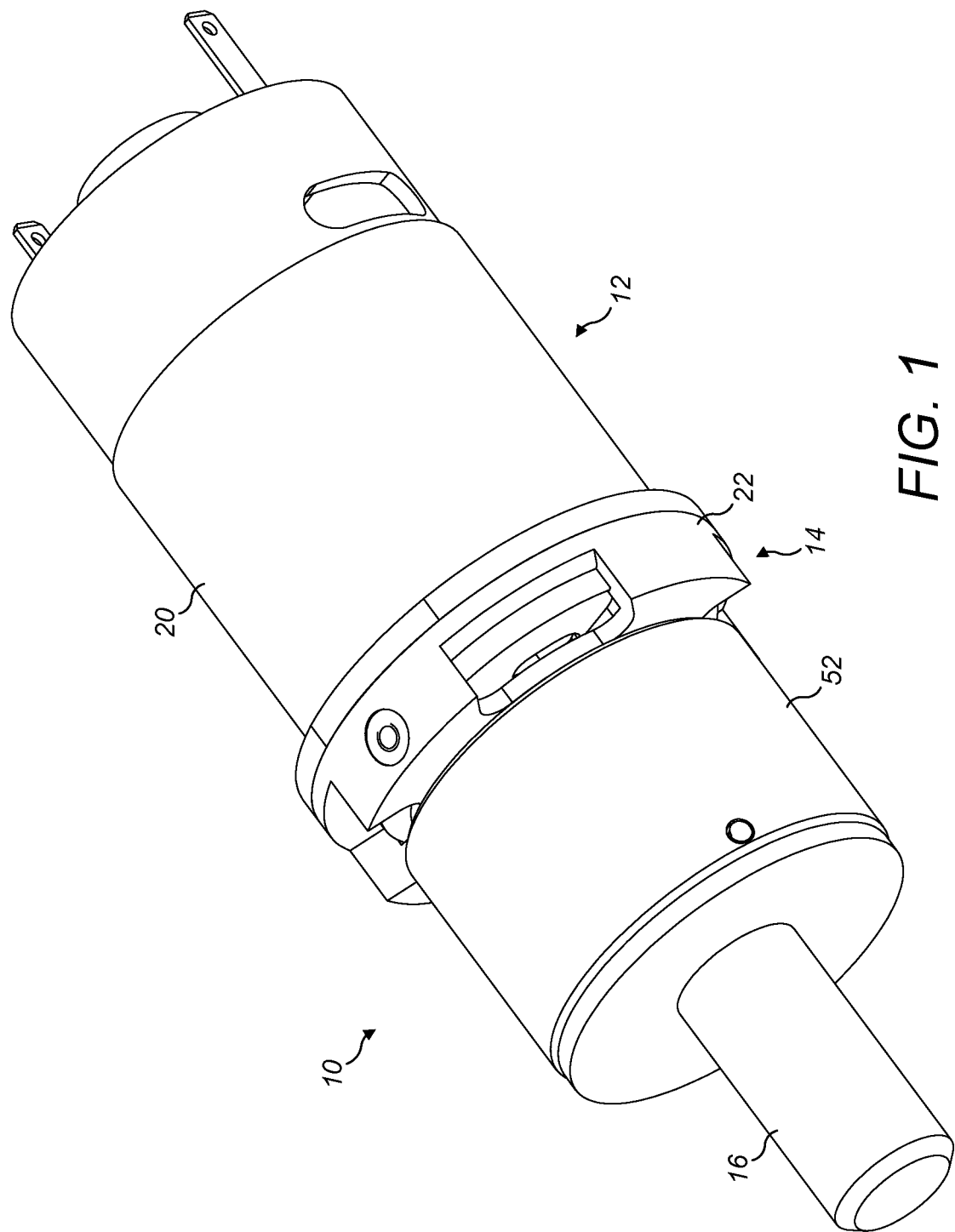
FIG. 1 is a perspective view of an electric drive.
Figure 2:
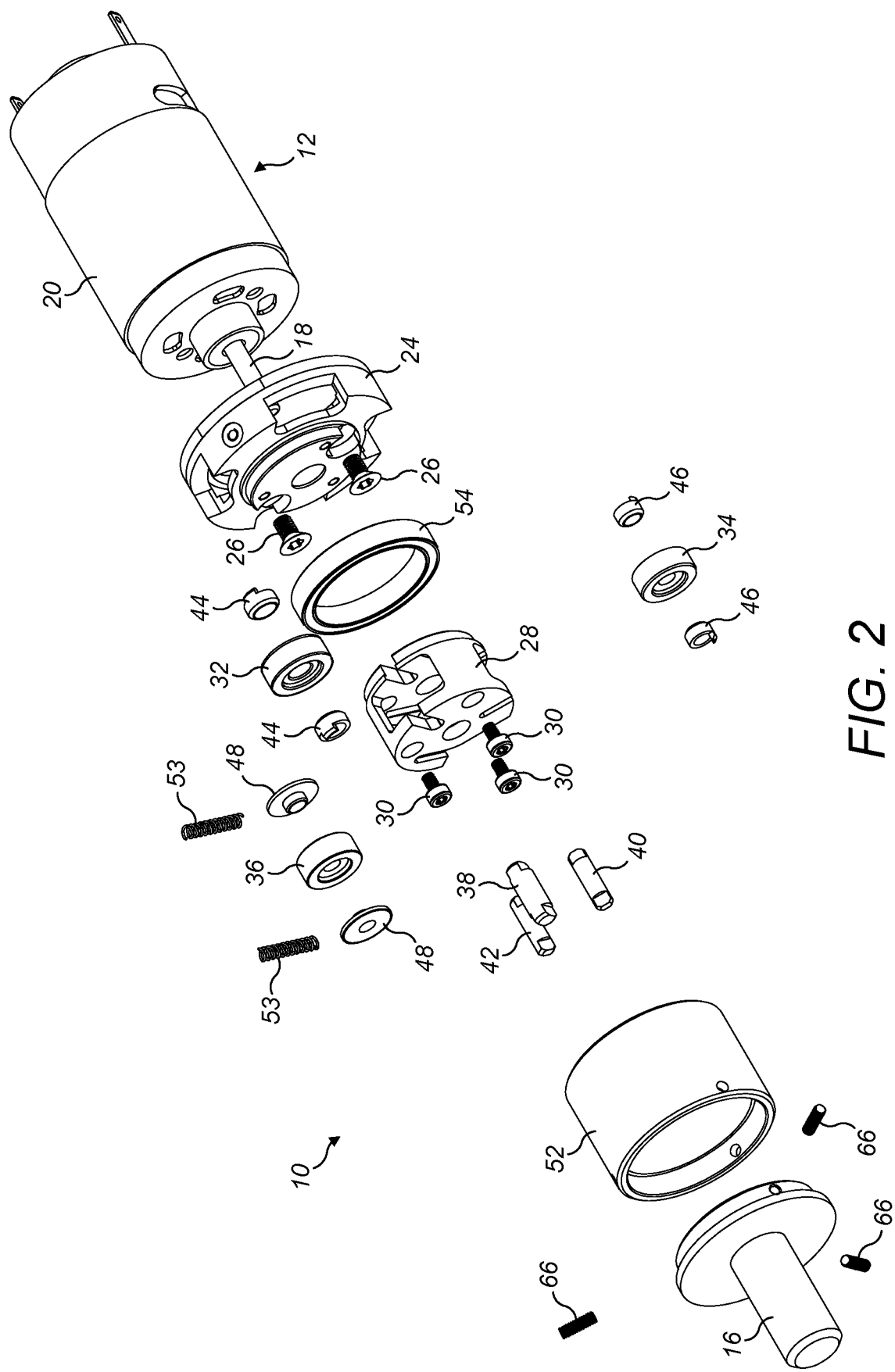
FIG. 2 is an exploded view of the electric drive.
Figure 3:
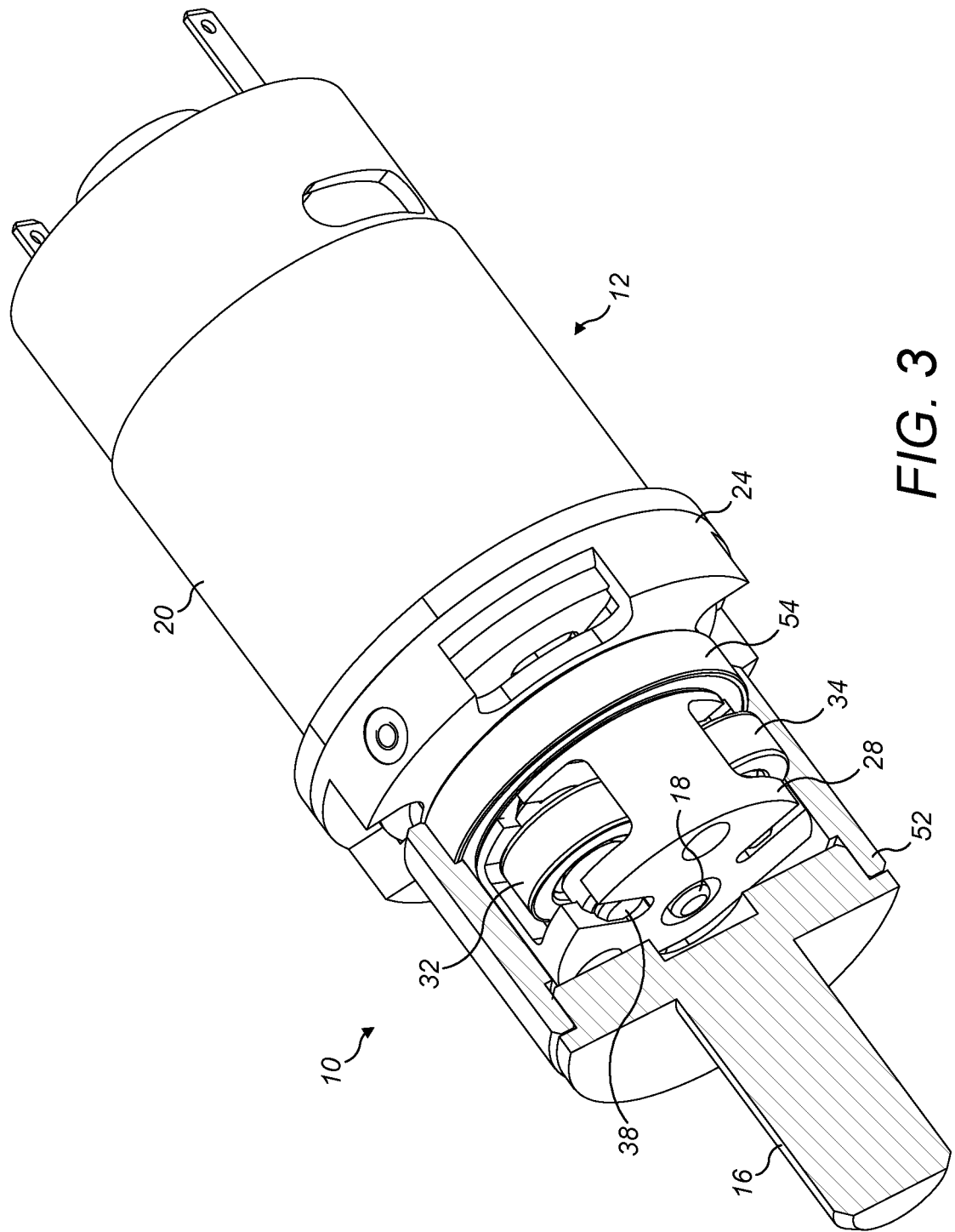
FIG. 3 is a perspective view, partially in section, of the electric drive.
Figure 4:
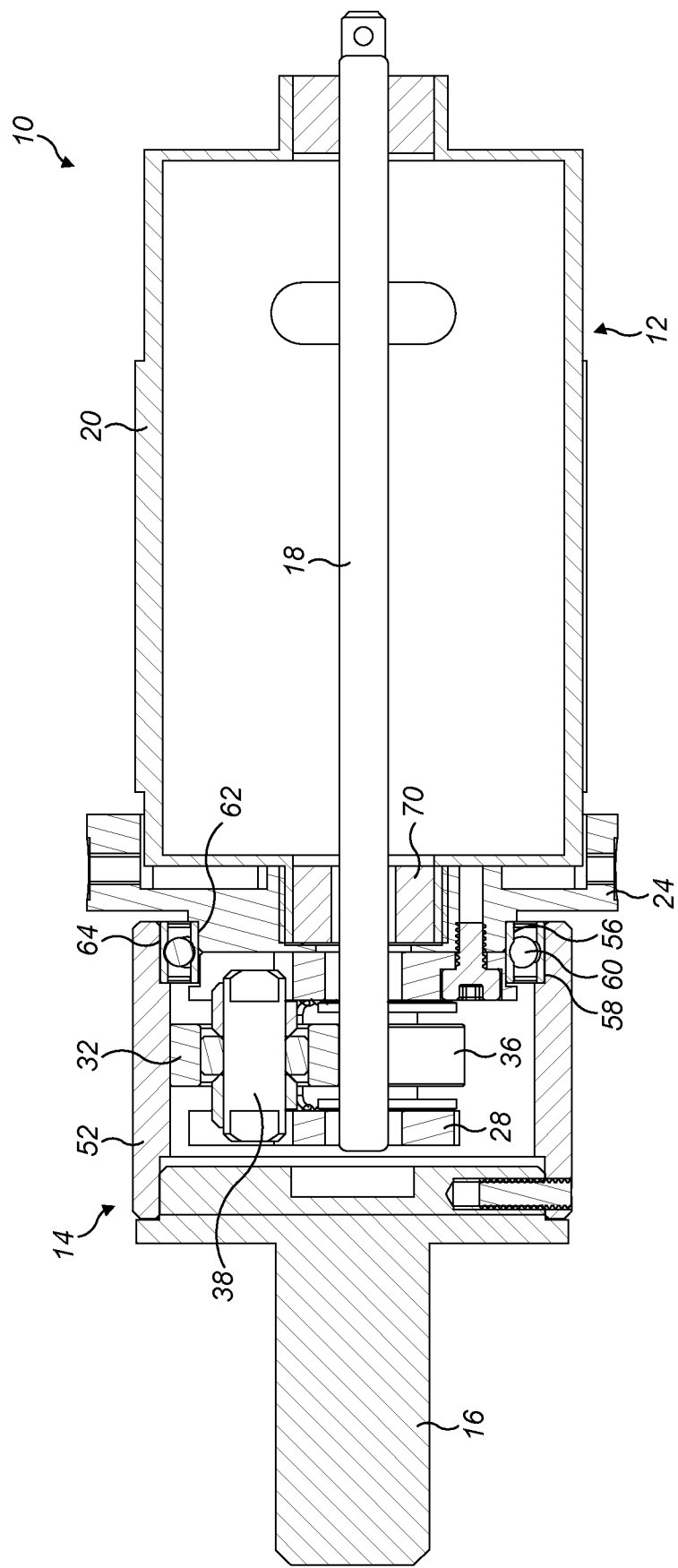
FIG. 4 is a side sectional view of the electric drive.
Figure 5A:
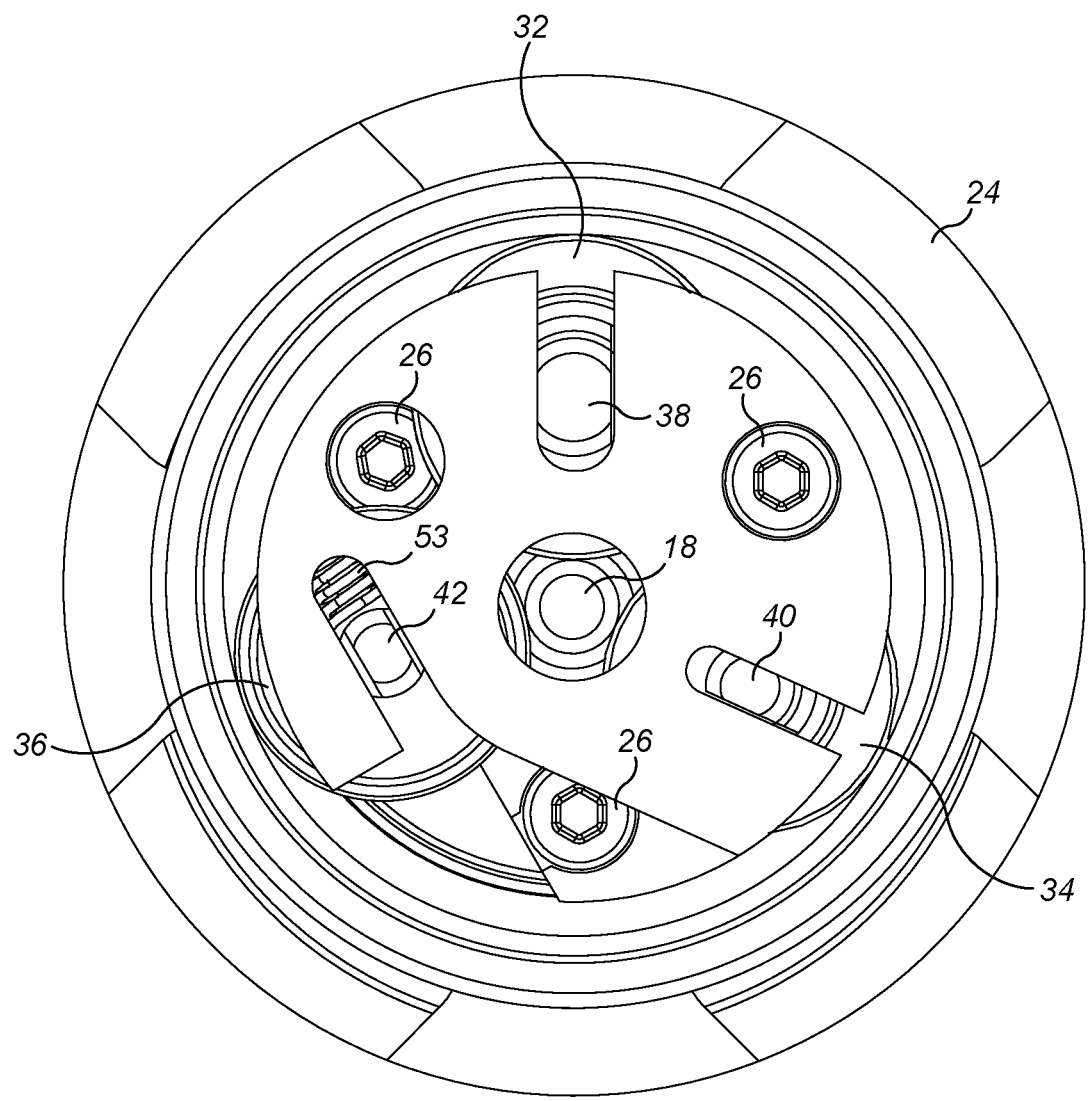
FIG. 5(a) is a front view of the electric drive with the spindle removed.
Figure 5B:
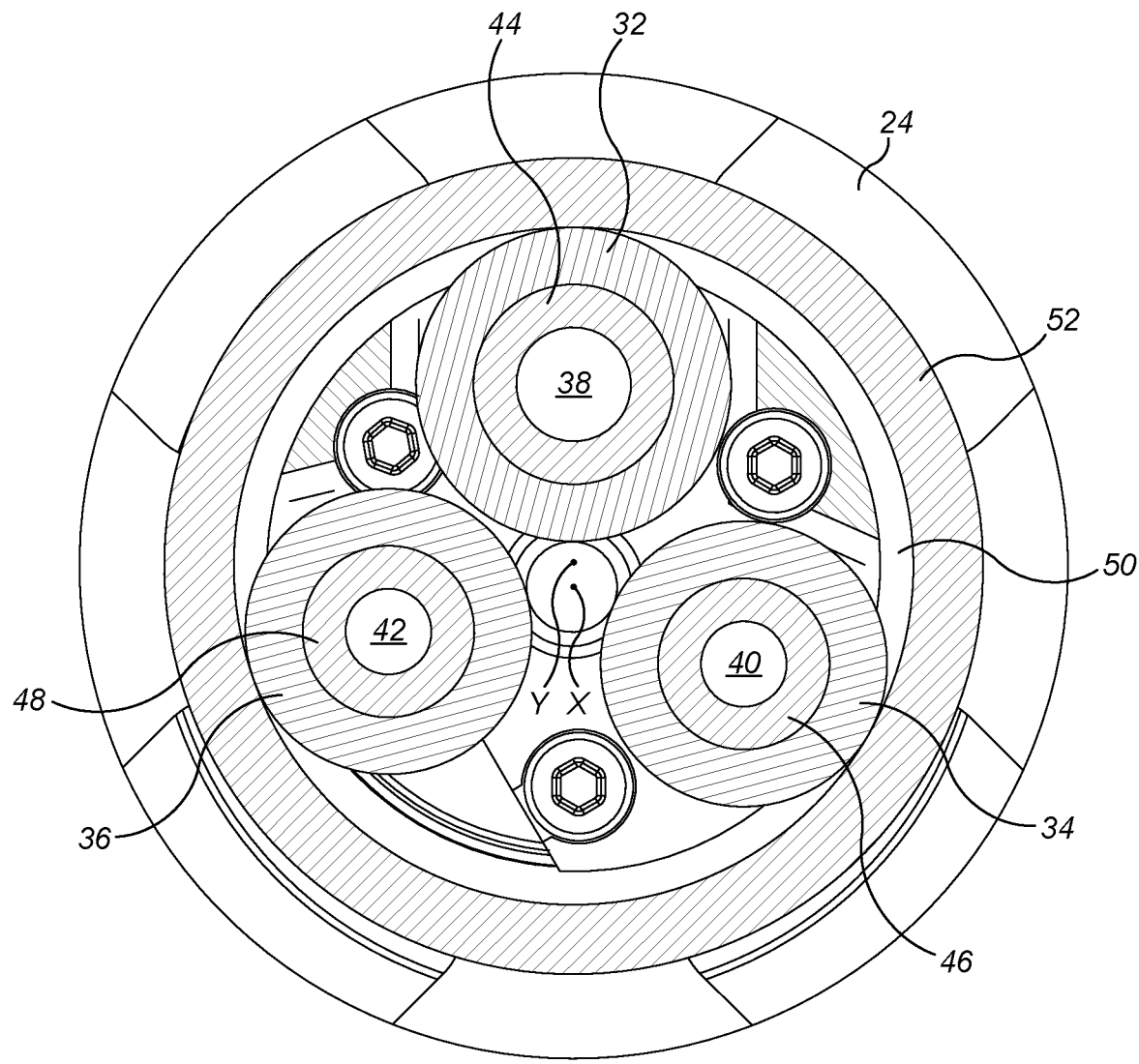
FIG. 5(b) is a front sectional view of the electric drive.
Figure 6:
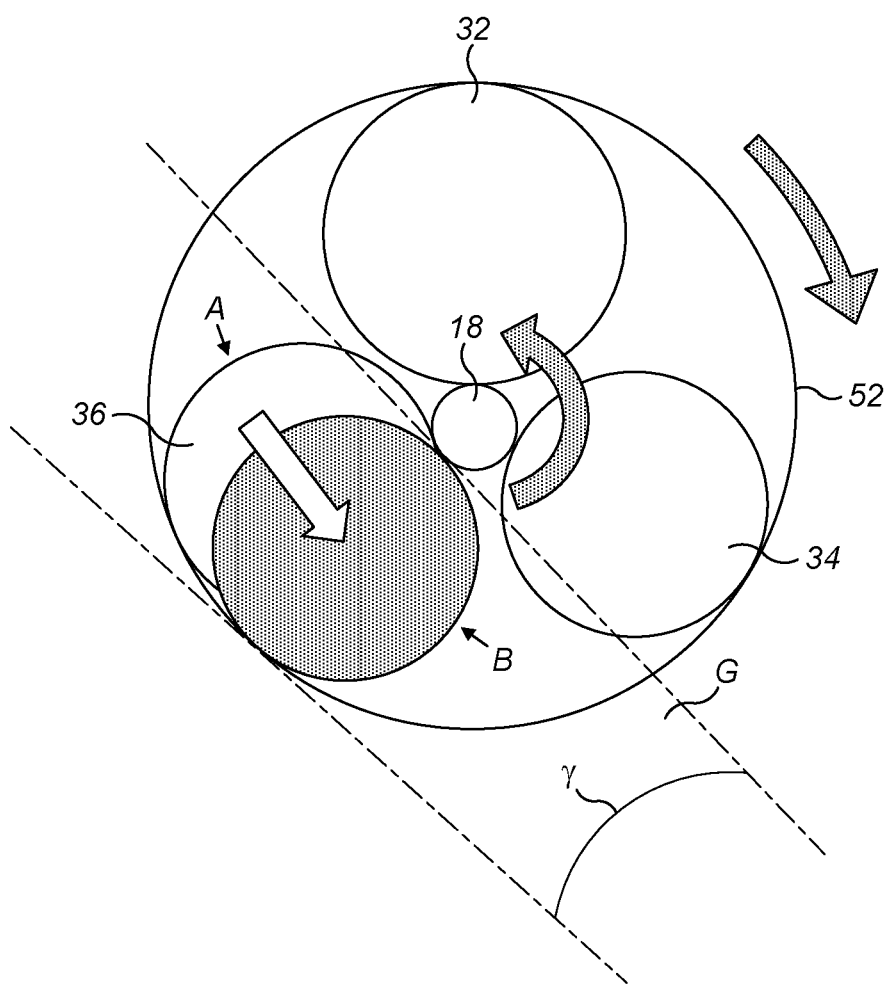
FIG. 6 illustrates schematically lateral movement of one of the planetary rollers of the electric drive during use thereof.

FIG. 1 illustrates an electric drive 10. The electric drive 10 comprises a motor 12 and a transmission 14 which is connected to, and driven by, the motor 12. The transmission 14 transfers torque from the motor 12 to a spindle 16 which is connected to the transmission 14. With reference to FIGS. 2 to 6, the motor 12 has a rotary shaft 18 which extends from a housing 20 of the motor 12. The transmission 14 comprises a casing 22 which is connected to the housing 20 of the motor 12. The casing 22 comprises a base plate 24 which is secured to the housing 20 by screws 26, and a cover plate 28 which is connected to the base plate 24 by screws 30. The rotary shaft 18 protrudes into the casing 22 through the base plate 24 such that the rotary shaft 18 is spaced from the casing 22.

The transmission 14 further comprises planetary rollers 32, 34, 36 which are driven by the rotary shaft 18. The planetary rollers 32, 34, 36 are mounted on planetary shafts 38, 40, 42 supported by the cover plate 28 so that the planetary shafts 38, 40, 42 are aligned parallel to the rotary shaft 18. Each planetary roller 32, 34, 36 is supported between a pair of bearings 44, 46, 48 to allow the planetary roller 32, 34, 36 to rotate freely relative to the casing 22. A lubricant, which may be oil or grease, is preferably provided to transfer torque between the rotary shaft 18 and the planetary rollers 32, 34, 36, and so reduce friction and wear between the moving parts of the transmission 14.

The planetary rollers 32, 34, 36 comprise first roller 32 having a relatively large diameter and a second roller 34 having a relatively small diameter. Each of the first roller 32 and the second roller 34 rotate about axes which are fixed in position relative to the rotational axis X of the rotary shaft 18. The planetary rollers 32, 34, 36 further comprise a third roller 36 which has the same diameter as the second roller 34. The third roller 36 is able to move laterally relative to the first roller 32 and the second roller 34 within an annular space 50 defined between the rotary shaft 18 and an output ring 52 of the transmission 14. The third roller 36 is biased towards a first position, indicated at A in FIG. 6, which is adopted by the third roller 36 when no load is applied to the transmission 14 by the motor 12. The third roller 36 is biased towards the first position A by resilient elements 53, preferably in the form of springs, which are located between the casing 24 and the planetary shaft 42. Under load, the third roller 36 moves laterally from the first position A to a second position B located within a convergent wedge gap G defined by tangents to the rotary shaft 18 and the output ring 52. In this embodiment, the angle γ of the wedge gap G is 4.5° when no load is applied to the transmission 14.

The output ring 52 is driven by the planetary rollers 32, 34, 36. A lubricant is preferably provided to transfer torque between the planetary rollers 32, 34, 36 and the output ring 52. In view of the different diameters of the planetary rollers 32, 34, 36, the output ring 52 is eccentric to the rotary shaft 18, the rotation axis Y of the output ring 52 being parallel to, but spaced from, the rotational axis X of the rotary shaft 18.

The output ring 52 is supported in both radial and axial directions by a bearing 54. In this embodiment, the bearing 54 is a rolling bearing having an inner race 56 which is held in a fixed position relating to the casing 22, an outer race 58 and a set of rolling elements 60 for allowing rotation of the outer race 58 relative to the inner race 56. A lubricant is provided to reduce friction and wear between the moving parts of the bearing 54. The inner race 56 is accommodated within an annular groove 62 formed on the outer periphery of the casing 22. The annular groove 62 has a circumferential surface extending about the casing 22 and opposing axial surfaces at the axial extremities of the annular groove 62, the inner race 56 engaging the surfaces of the annular groove 62. The outer race 58 engages and rotates with the output ring 52. The outer race is accommodated within an annular groove 64 formed on the inner periphery of the output ring 22. The annular groove 64 is preferably located at the end of the output ring 52 which is proximate to the base plate 24 of the casing 22. The annular groove 64 has a circumferential surface extending about the inner periphery of the output ring 52 and a shoulder at the extremity of the annular groove 64 which is remote from the end of the output ring 52, the outer race 58 engaging these surfaces of the annular groove 64. The position of the bearing 54 at the end of the output ring 52 enables the bearing 54 to provide a seal for inhibiting the ingress of dirt and other debris into the transmission 14, and for inhibiting the egress of lubricant from the transmission 14.

The spindle 16 is connected to the output ring 52 by screws 66. The spindle 16 rotates about the rotational axis Y of the output ring 52. The spindle 16 is connectable to a tool (not shown) which is driven by the electric drive 10. One such tool is a brush bar of a cleaner head of a surface treating appliance, such as a vacuum cleaner.

In this embodiment, the motor 12 is arranged to rotate the rotary shaft 18 at a speed of up to 25,000 rpm, and the gear ratio of the electric drive 10 is 7.5:1. As the rotary shaft 18 rotates, it exerts a tangential force on the third roller 36 which moves laterally from position A to position B, and so into the wedge gap G defined by the tangents to the rotary shaft 18 and output ring 52, where the third roller 36 becomes tightly lodged. The forces at the points of contact between the rotary shaft 18 and the planetary rollers 32, 34, 36 increase, as do the forces at the points of contact between the planetary rollers 32, 34, 36 and the output ring 52, which enables sufficient torque to be transferred to the output ring 52, and thus the spindle 16, to maintain rotation of the tool connected to the spindle 16 during use thereof. With this gear ratio of the transmission 14, the maximum rotational speed of the output ring 52, and thus the spindle 16, is in the range from 3,000 to 3,500 rpm.

As the position of the output ring 52 relative to the housing 20 of the motor 12 is fixed, the lateral movement of the third roller 36 is accommodated through lateral movement of the (exposed) front end of the rotary shaft 18 relative to the output ring 52. This is achieved through providing only a relatively loose support of a front section of the rotary shaft 18 relative to the housing 20, for example through use of a relatively loose plain bearing 70 between the front section of the rotary shaft 12 and the housing 20, which allows the rotary shaft 18 to pivot relative to the housing 20.

In summary, an electric drive 10 includes a motor 12 and a transmission 14 for transferring torque from the motor 12 to a tool. The transmission 14 includes a plurality of planetary rollers 32, 34, 36 which are driven by a rotary shaft 18 of the motor, and an output ring 52 which is connectable to the tool, and which is driven by the planetary rollers. The transmission further includes a roller casing 22 which is secured to a housing 20 of the motor, and which supports parallel planetary shafts 38, 40, 42 upon which the planetary rollers are mounted for rotation relative to the roller casing, and a bearing 54 having an inner race 56 which engages the roller casing, and an outer race 58 which engages the inner periphery of the output ring.

The invention claimed is:

1. An electric drive comprising:
   a motor having a rotary shaft; and
   a transmission comprising:
      a plurality of planetary rollers which are driven by the shaft;
      an output ring which is driven by the planetary rollers;
      the planetary rollers comprising at least one relatively large diameter planetary roller and a plurality of relatively small diameter planetary rollers, wherein the at least one relatively large diameter planetary has a diameter larger than diameters of the plurality of relatively small diameter planetary rollers, and wherein one of the relatively small diameter planetary rollers is movable under load into a convergent wedge gap defined by the rotary shaft and the output ring;
      a roller casing secured to a housing of the motor, the roller casing supporting parallel planetary shafts upon which the planetary rollers are mounted for rotation relative to the roller casing; and
      a bearing having an inner race which directly engages the roller casing, and an outer race which directly engages an inner periphery of the output ring.

2. The electric drive of claim 1, wherein said one of the relatively small diameter planetary rollers is biased towards the wedge gap.

3. The drive of claim 1, wherein an outer periphery of the roller casing comprises an annular casing groove having a circumferential surface and at least one axial surface, and wherein the inner race of the bearing engages the surfaces of the casing groove.

4. The drive of claim 1, wherein the inner periphery of the output ring comprises an annular output ring groove having a circumferential surface and at least one axial surface, and wherein the outer race of the bearing engages the surfaces of the output ring groove.

5. A cleaner head for a vacuum cleaner, the cleaner head comprising a casing, a brush bar, and the electric drive of claim 1 for driving rotation of the brush bar relative to the casing, the brush bar being connected to the output ring of the transmission.

\* \* \* \* \*